United States Patent [19]
Starcevic

[11] 3,988,622
[45] Oct. 26, 1976

[54] DYNAMO-ELECTRIC MACHINE WITH PRESTRESSED LAMINATED STATOR COMPONENT

[75] Inventor: Mihailo Starcevic, Mellingen, Switzerland

[73] Assignee: BBC Brown Boveri & Company Limited, Baden, Switzerland

[22] Filed: Aug. 6, 1975

[21] Appl. No.: 602,187

Related U.S. Application Data
[63] Continuation of Ser. No. 422,099, Dec. 5, 1973, abandoned.

[30] Foreign Application Priority Data
Dec. 11, 1972 Switzerland .................. 17891/72

[52] U.S. Cl. .................................. 310/91; 310/89; 310/157; 310/258
[51] Int. Cl.² ............................................ H02K 5/24
[58] Field of Search ............. 310/91, 157, 89, 258, 310/259, 254, 216–218

[56] References Cited
UNITED STATES PATENTS

| | | | |
|---|---|---|---|
| 1,702,448 | 2/1929 | McCarty | 310/258 |
| 3,237,035 | 2/1966 | Hoffmann | 310/217 |
| 3,293,464 | 12/1966 | Spirk | 310/89 |
| 3,387,152 | 6/1968 | Mucke | 310/157 X |
| 3,519,857 | 7/1970 | Plumb | 310/258 X |
| 3,708,707 | 1/1973 | Kranz | 310/258 |
| 3,742,271 | 6/1973 | Whitney | 310/157 |

*Primary Examiner*—Donovan F. Duggan
*Attorney, Agent, or Firm*—Pierce, Scheffler & Parker

[57] ABSTRACT

The laminated stator component of a dynamo-electric machine is prestressed in such manner as to free the laminations from temperature-induced compressive stresses that otherwise may result in displacement of the laminations. In particular, the stator lamination assembly is prestressed in tension, with respect to the cold condition, in an outward direction, by an amount corresponding at least approximately to the difference in expansion between the laminations fixed in the stator frame and those freely expanded at the same temperature. The laminations are held continuously in tension, preferably in a radially outwards direction, in the stator frame or foundation, which is thus at least partly pre-compressed inwards, in such manner that under all practicable operating temperatures of the machine, no compressive stresses can occur in the laminations.

9 Claims, 20 Drawing Figures

DYNAMO-ELECTRIC MACHINE WITH PRESTRESSED LAMINATED STATOR COMPONENT

This is a continuation, of application Ser. No. 422,099 filed Dec. 5, 1973, now abandoned.

The present invention relates to an improved construction for a prestressed laminated stator component of a dynamo-electric machine.

Swiss Pat. No. 489,133 describes a mode whereby, in the case of electrical machines with vertical shafts, the stator frame is fixed to the bearing points of the machine foundation in such a way that when the machine is in operation, and hence temperatures rise, the mode of fixing the stator cannot give rise to any compressive stresses additional to those resulting from differential heating of the frame and the laminations. As a solution to this problem of mounting, it is accordingly proposed that after the machine has heated up to its maximum operating temperature for the first time, or alternatively the expansion of the stator frame has attained its maximum value, the frame should be fixed to the above-mentioned bearing points in the position obtained at this operating temperature and with a central air gap so that the compressive stresses arising in the stator are only those caused by differential heating of the frame and laminations.

The solution previously described thus relates to a mode of radially fixing the stator heated to its operating temperature, but not to a mode of eliminating the compressive stresses in the laminations themselves, nor to a mode of preventing displacement of the stator sheets comprising the lamination assembly.

In addition it is assumed in the Swiss Patent referred to that the compressive stresses caused by differential heating of the frame and laminations are only of such small magnitude that the feared undulations within the lamination assembly due to displacement of the sheets do not occur.

However, the displacement of stator laminations due to thermal stresses in large hydroelectric generators has been discussed in detail in the Brown Boveri Review of September 1966, volume 50, number 9, pages 538–545, where it is stated that when in operation the stator laminations exhibit higher temperatures and greater radial expansion than the stator frame, and consequently the stator frame is stressed in tension while the laminations are stressed in compression in such a way that thin stator sheets especially tend to become displaced under this pressure. The assumption made in Swiss Pat. No. 489,133 regarding compressive stresses in the stator lamination assembly is refuted in particular by the fact that the stators of large vertical hydroelectric machines, for example, are especially susceptible to displacement of the stator sheets even in the event of relatively small compressive stresses.

The general object of the present invention is thus to free the stator laminations from at least such compressive stresses as cause displacement of the sheets, so that under all operating conditions of the machine, no displacement of the stator sheets can occur as a result of thermal expansion.

This objective is achieved in that the stator lamination assembly is prestressed in tension, with respect to the cold condition, in an outward direction by an amount corresponding at least approximately to the difference in expansion between the stator laminations fixed in the stator frame and those freely expanded at the same temperature, particularly the operating temperature. Accordingly, the stator laminations are held continuously in tension, preferably in a radial outwards direction, in the stator frame or foundation, which is thus at least partly pre-compressed inwards, in such a manner that under all practicable operating temperatures of the machine no compressive stresses can occur in the stator laminations which would otherwise displace the lamination sheets.

The solution described at least ensures that, should compressive stresses happen to occur in the stator laminations under exceptional circumstances, e.g. in the event of high laminations temperatures, these will always be less than the tangential displacement stress $$\sigma_k = \frac{E h^2}{r_B^2} \cdot \frac{z^2}{48}$$

of the stator lamination assembly, as stated in the issue of the Brown Boveri Review referred to above, where $h$ is the sheet thickness, $r_B$ the mean radius of the lamination assembly, $E$ the modulus of elasticity and $z$ the number of fixing plates arranged the periphery.

In order to put the invention into practice it is recommended that means of adjustment should be located between the stator laminations and the remainder of the stator, or between this and the foundation, and if required between the other parts of the stator, such that these means of adjustment hold the complete stator together under mechanical prestresses, and fix the stator to the foundation. Thus it is proposed to locate spindles between the lamination assembly and the stator frame. Also, between the stator frame and the foundation ring it is possible to arrange adjusting devices, positioning devices, wedges, hydraulic rams or fixing devices. It is of particular advantage also to fit non-return locks, jacks or heating devices between the stator frame and the foundation. In addition, the spindles mentioned above can also be located between the foundation ring and the foundation in order to indicate the position of certain of the means of adjustment and their location on the electrical machine.

The advantages of the invention consist particularly in the fact that prestressing of the stator laminations in tension completely prevents displacement of the laminations due to thermal stresses. This can be achieved in the manner described above at least partly by using simple means. In contrast to designs with compressed lamination assemblies, with electrical machines constructed according to the invention the tangential spacing between the bars, i.e. the free length between two adjacent support points, is of less importance. The number of wedges in the machine can therefore be reduced.

The invention will now be described in more detail with reference to the examples shown in the drawings, in which.

Figure 1:
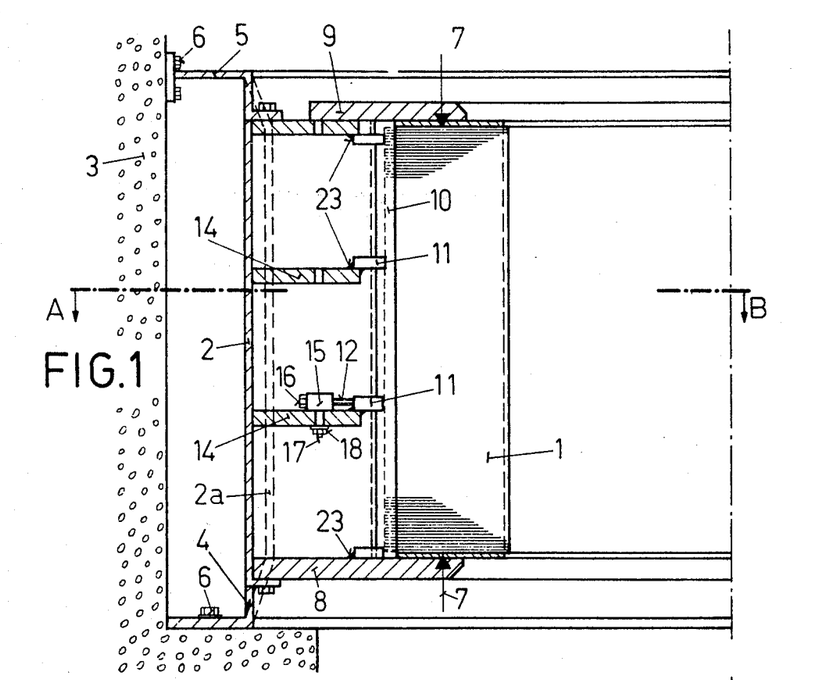
FIG. 1 is half an axial section passing through the centre of a vertical generator.
Figure 2:
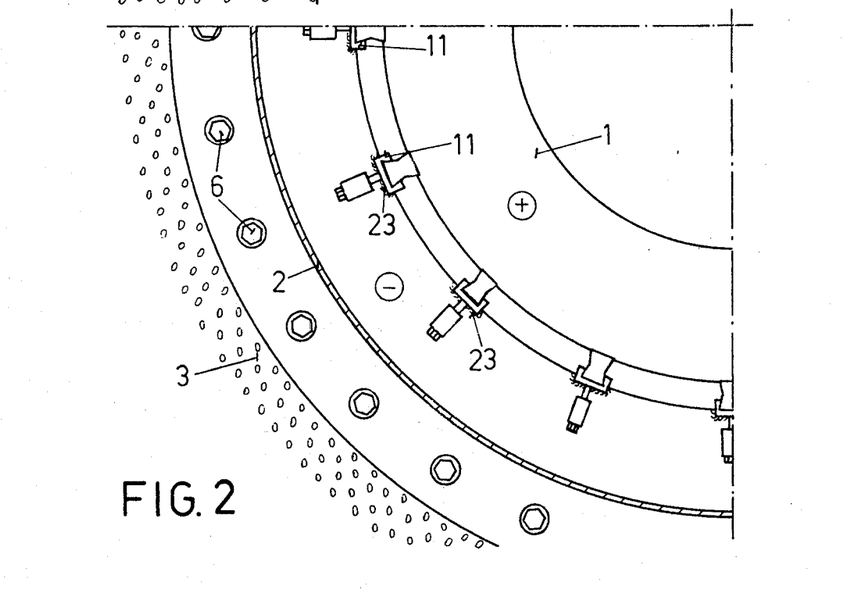
FIG. 2 is a horizontal section through a quarter of such a generator at line AB and viewed in the direction of the arrows.

FIG. 1 shows half of an axial section through the centre of a vertical generator, while FIG. 2 is a section horizontally at line AB through one quarter of such a generator. The stator frame 2, of shell construction, is supported on foundation 3 by way of a foundation ring 4 and fixed laterally to foundation 3 with the aid of a cantilever support bracket 5, the foundation bolts, for example, being denoted 6. The stator frame 2 is consequently fixed in the cold condition to foundation 3 at the beginning of erection, i.e. before any other assembly operations. The stator laminations 1, compressed in the directions of arrows 7, are clamped between the lower pressure plate 8 and upper pressure plate 9 and fixed to the stator frame by means of bars 10 and lamination plates 11. The construction is such that the stator lamination assembly 1 is prestressed radially outwards relative to the stator frame 2 by tension applied by the lamination plates 11 which are distributed uniformly round the circumference of the laminations and act as a connecting link. This can be achieved temporarily by means of adjustment, such as the spindles 12 shown for example in FIGS. 3 and 4, which can then be permanently replaced by the lamination plates 11 referred to. In this way the stator laminations 1 are prestressed in tension, while the stator frame is prestressed in compression, as is shown symbolically in FIG. 2 by a (+) sign for the tensile stress on item 1 and by a (−) sign for the compressive stress on item. 2. The foundation ring 4 or the frame feet 13 (see FIG. 5) or some other suitable intermediate member between the stator frame 2 itself and the foundation 3, must be made flexible in order to allow the consequent changes in dimensions, particularly elastic deformation of stator frame 2, the frame wall elastically deformed by pressure being denoted by the broken lines 2a.

Figure 3:
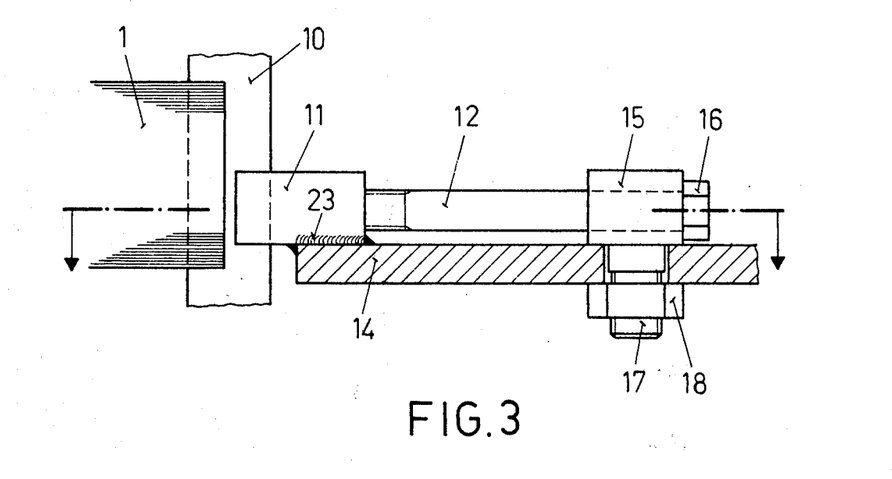
FIG. 3 shows a means of adjustment in the form of a spindle in side view.
Figure 4:
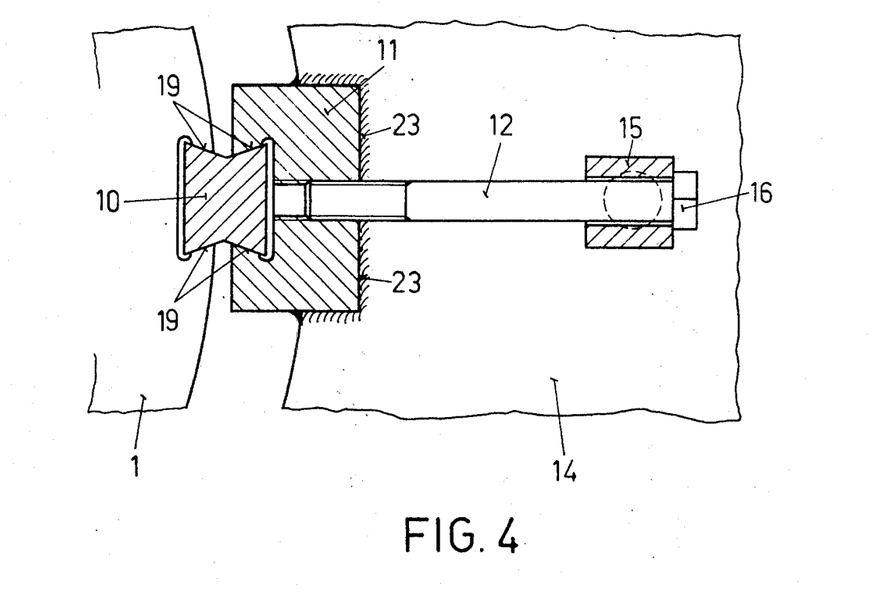
FIG. 4 is the corresponding plan view.

FIG. 3 shows in side view a spindle 12 located between stator laminations 1 and a web 14 of the frame, while FIG. 4 shows the same in plan view, the individual parts in these two figures being shown in section. The reference numbers here correspond to those in FIGS. 1 and 2. The lamination plate 11 is fixed by means of spindle 12 to the stator frame web 14, the guide 15 for the shaft of spindle 12, provided with head 16, being fixed by means of a grub screw 17 and nut 18 to the frame web 14, and hence to the stator frame 2, not shown. The tapered flanks 19 of bars 10, also not shown in full, are subjected only to compressive forces. The double-wedge profile of each bar 10 is of such a shape, e.g. a double dovetail or an I section, that it can transmit tensile forces in the radial direction of the stator. For this reason the axial compression of the stator lamination assembly 1 must be maintained continuously. This can be achieved by fitting resilient components, such as spring washers 20 (see FIG. 18), such devices being located at the ends of the bars 10 between the pressure plates 8 and 9 and tensioning nuts 21 and 22 (see FIG. 18). It is to be understood that the stator lamination assembly 1 can at least partly be glued, e.g. with a synthetic resin. Maintaining the initial stress on the stator laminations 1 can also be aided by welds at the edges of the sheets at least locally, e.g. in the form of strips. Once the initial stress has been applied in the described manner by means of spindles 12 so that under all operating conditions dangerous compressive stresses in stator lamination assembly 1, or at least such stresses which could cause displacement of the individual laminations, are avoided, the lamination plates 11 can be permanently fixed, in particular by means of welds 23, to form a connection of the frame webs 14 and hence to stator frame 2, and the spindles 12, including head 16, guides 15, grub screw 17 and nut 18, can then be removed.

Figure 5:
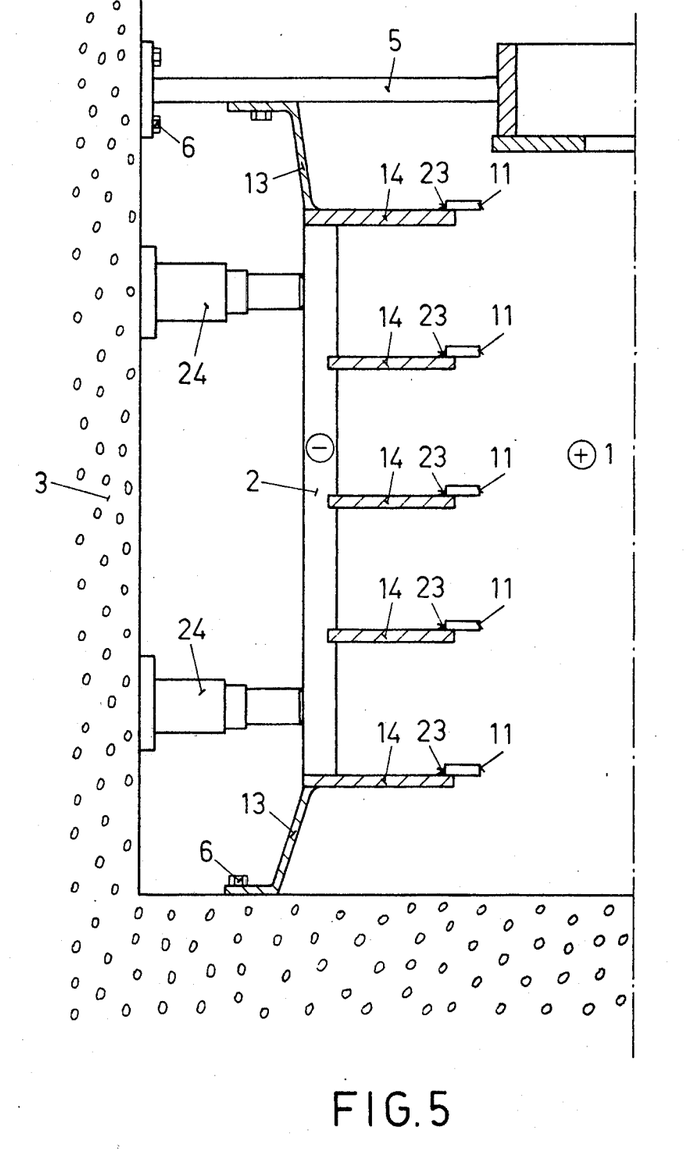
FIG. 5 shows an example of the invention with jacks bearing on the stator frame.

FIG. 5 shows an example of the invention in which again at least no dangerous compressive stresses can occur in the stator laminations 1 under operating conditions. To this end, the stator frame 2 is fixed to foundation 3 with foundation bolts 6 by way of feet 13 before the laminations are fitted. In this case the internal prestressing or stator lamination assembly 1 and stator frame 2 is achieved by compressing stator frame 2 radially inwards. This can be done with commercially available jacks, for example, which act on the stator frame at points uniformly distributed round its outer circumference. For this purpose the jacks 24 can be mounted on the vertical walls of the foundation 3. Once the stator frame 2 has acquired the necessary compressive stress in this way, the stator laminations 1 are fixed to the stator frame 2 by means of lamination plates 11 so that after the jacks 24 have been removed, the stator laminations 1 are continuously held under tensile stress as the stator frame tries to spring back.

Figure 6:
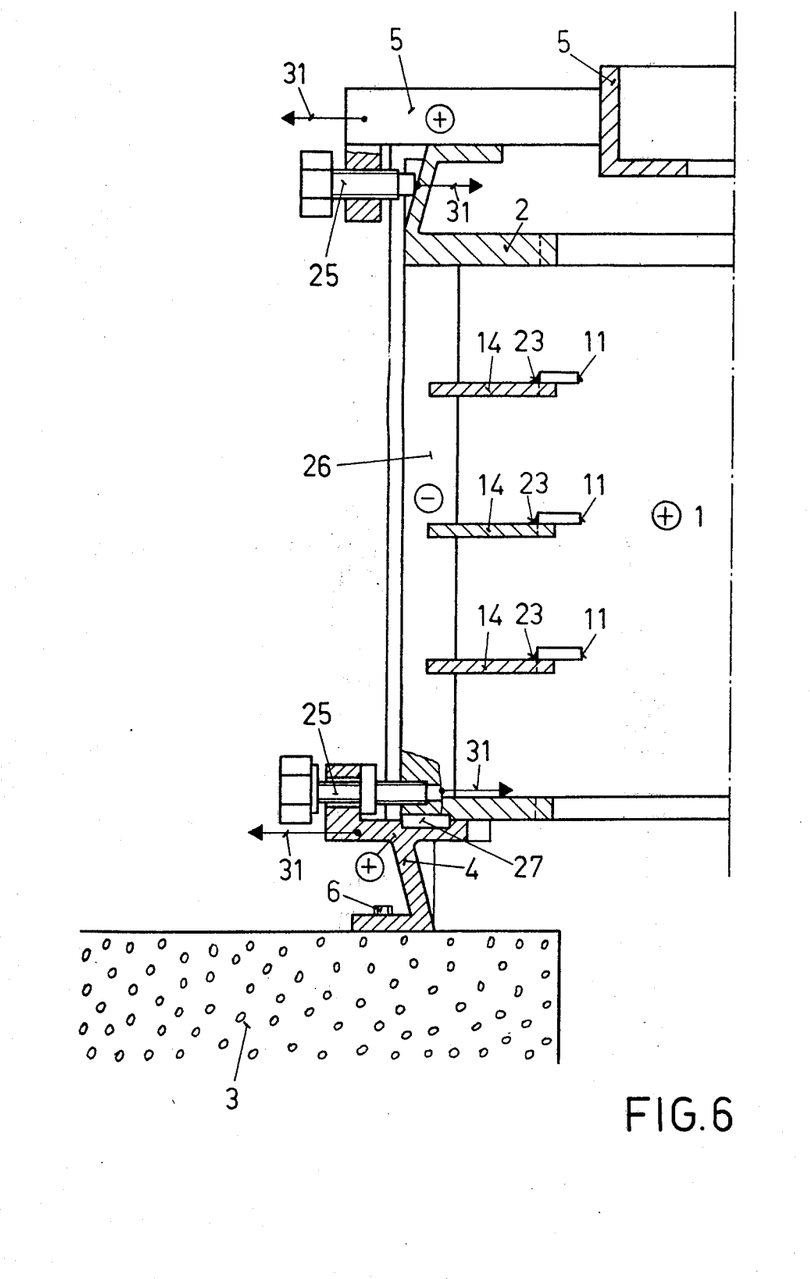
FIG. 6 depicts another example with adjusting devices on the supporting bracket and on the foundation ring.

In the example of the use of adjusting devices 25 illustrated in FIG. 6, these devices are supported in particular on support bracket 5 and foundation ring 4. Since the adjusting devices 25 can here act either radially inwards or radially outwards, depending on the direction in which they are turned, the mechanical initial stress of the stator, i.e. stator frame 2 and stator laminations 1, can be varied and hence corrected. Once the required compressive stress on stator frame 2 has been achieved, with the aid of means of adjustment described below and possibly also adjusting devices 25, as indicated symbolically by the (−) sign in FIG. 6, the stator lamination assembly 1, not shown in FIG. 6, can be fitted and, as shown in FIGS. 1 and 2, welded by means of lamination plates 11 to frame webs 14 held by ribs 26. Once the stator lamination assembly 1 has been welded to the stator frame 2, the jacks 24 and adjusting devices 25, if used, can be removed, after which the stator frame 2 retains at least a small permanent compressive stress, whereas the stator laminations 1 are prestressed in tension in such a way that under feasible operating conditions no compressive stresses, or at least no dangerous compressive stresses, can occur in stator lamination assembly 1, as indicated in FIGS. 5 and 6 by the symbol (+)1 for the stator lamination assemblies shown. In the version illustrated in FIG. 6 it is also possible to fit radial studs 27 joining the foundation ring 4 to the stator frame 2, thus allowing parts 2 and 4 to be fixed when adjusted relative to each other.

Figure 7:
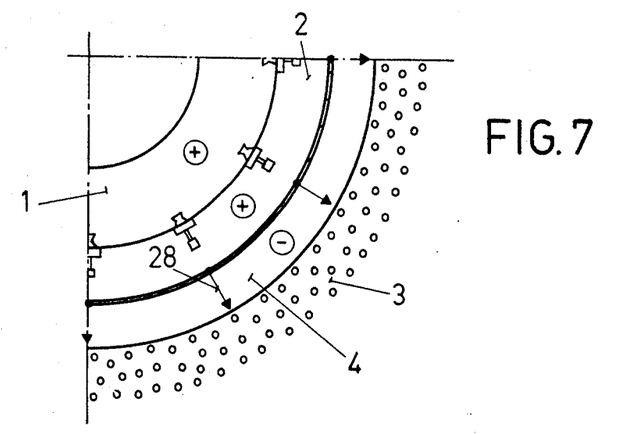
FIG. 7 is a further example with means of adjustment applying tensile force at the circumference of the stator frame.

In another version shown in FIG. 7 the stator, comprising essentially stator frame 2 and stator lamination assembly 1, is subjected to tensile stress in the radial direction by means of adjustment, such as positioning devices (see FIG. 8), wedges (see FIGS. 9 and 10) or hydraulic rams (see FIGS. 11 and 12) arranged uniformly round the periphery of the stator frame 2 and symbolised by deformation arrows 28 and indicated schematically by the (+) sign denoting the tensile stress of parts 1 and 2. The stator can then be fixed in its prestressed position by means of radial studs 27, for example. The fixing studs 27 or means of adjustment thus form a part of the complete structure. Whereas the stator frame 2 and lamination assembly 1 in this way remain prestressed in tension, the resilient elements between stator frame 2 and foundation 3, i.e. frame feet 13 or foundation ring 4, are deformed radially inwards, or compressed, so that in this version also a part of the stator is subjected to compressive stress, as is indicated symbolically in FIG. 7 by a (−) sign.

Figures 8, 13:
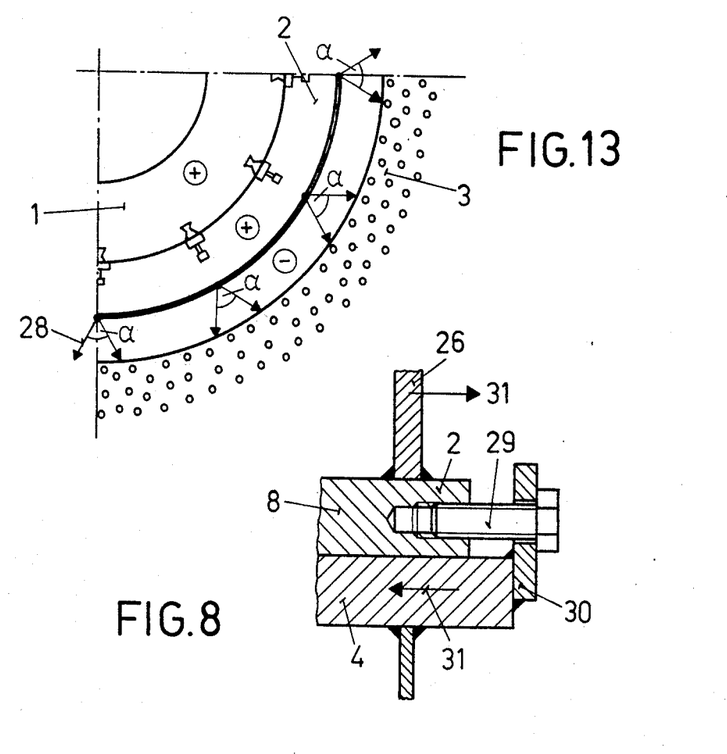
FIG. 8 shows a positioning device.
FIG. 13 shows another example of the invention with spindles arranged in pairs.

In FIG. 8, showing a positioning device, the spindle itself is denoted 29, the lower pressure plate 8 and the rib of the stator frame 26, as in the previous drawings. The positioning flange 30 carrying spindle 29 is welded to the foundation ring 4 so that rotation of spindle 29 causes a relative movement between stator frame 2 and foundation ring 4, as indicated by the arrows 31.

Figure 9:
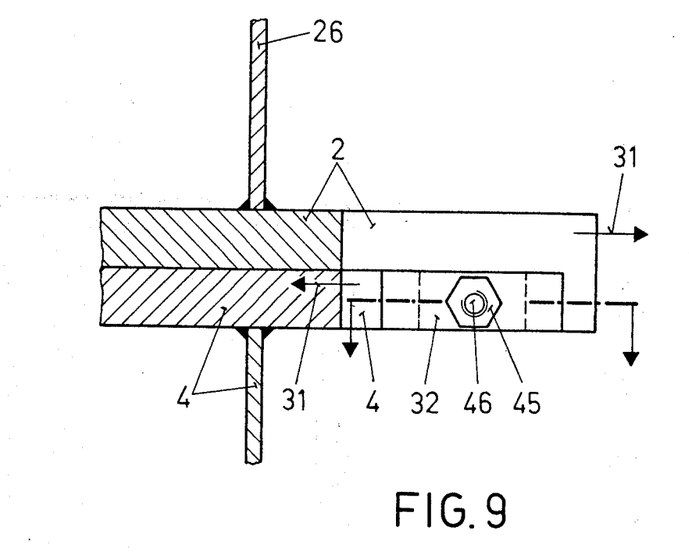
FIG. 9 is another means of adjustment shown in side view.
Figure 10:
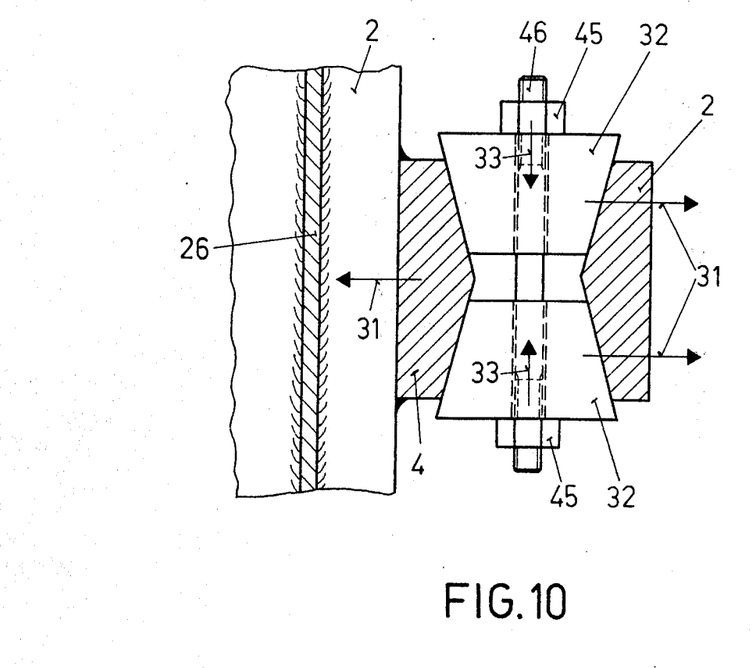
FIG. 10 is the corresponding plan view.

FIG. 9 shows a tensioning device with wedges 32 in side view, while FIG. 10 shows the same in plan view, the parts being identified by the same reference symbols as in the preceding figures. When nuts 45 on wedge spindle 46 are tightened in the direction of compression arrows 33, stator frame 2 is displaced relative to foundation ring 4 in the direction indicated by the arrows 31.

Figure 11:
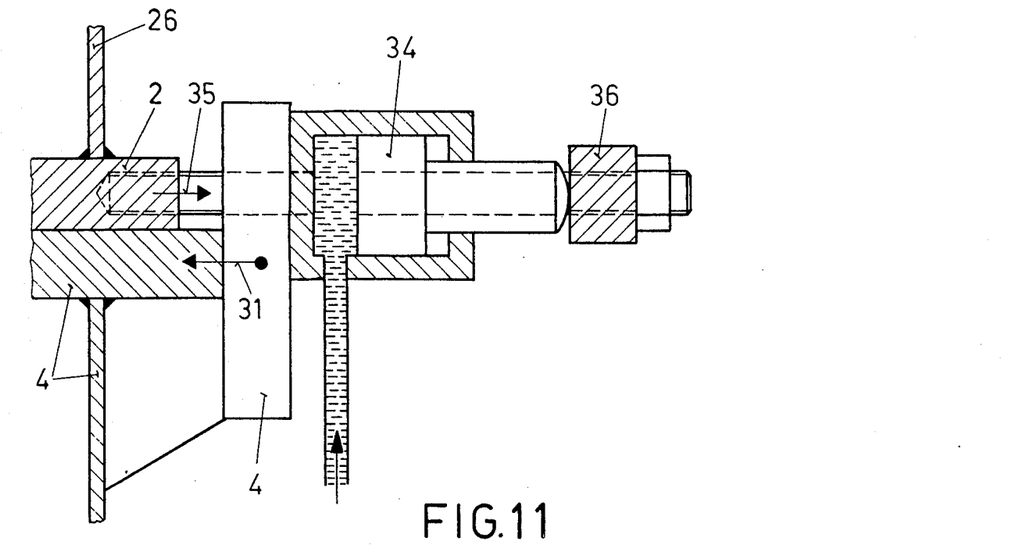
FIG. 11 shows a further means of adjustment in vertical section.
Figure 12:
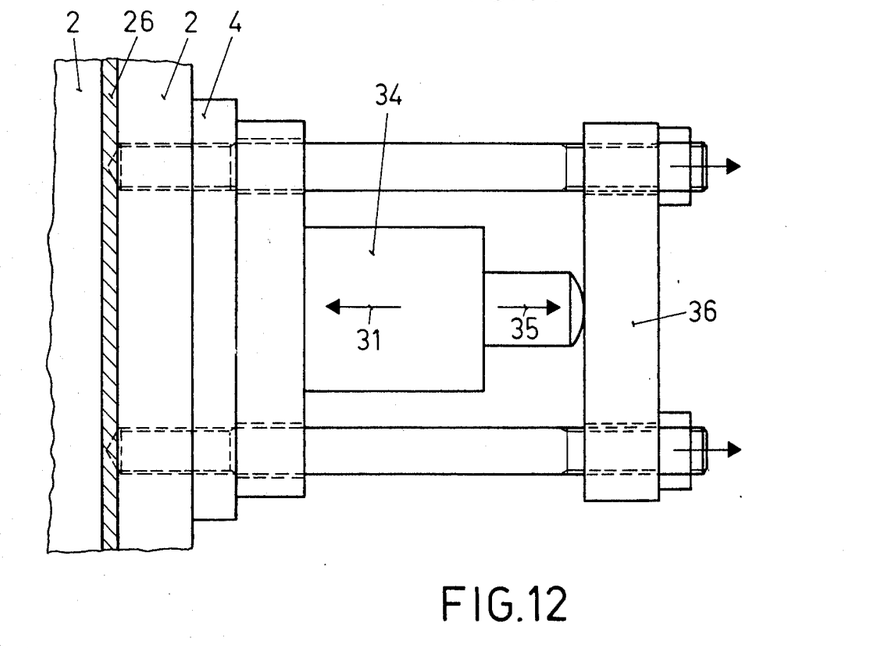
FIG. 12 is the corresponding plan view.

FIG. 11 shows a vertical section through an adjusting device employing an hydraulic ram 34, and the corresponding plan view can be seen in FIG. 12. It is apparent from these two figures that if the pressure of the liquid is raised, the hydraulic ram 34 presses against yoke 36 in the direction of the arrow 35, so that the foundation ring 4 moves radially inwards, in the direction of arrow 31, relative to the stator frame 2 or directional arrow 35.

If between stator and foundation 3 there are no resilient intermediate elements as described above, e.g. frame feet 13 or foundation ring 4, these elements can be replaced by means of adjustment in the form of spindles 29, for example, one of which is shown in FIG. 8. In this case such means of adjustment must be arranged between stator frame 2 and foundation 3 in such a way that they can also accommodate forces in the direction of the machine circumference.

An arrangement of this kind is shown in FIG. 13, the spindles 29 themselves being arranged in pairs at an angle α to each other. The actual spindles 29 are here represented by deformation arrows 28. Through suitable choice of angle α and appropriate elasticity of the spindles 29 it is possible, also in the circumferential direction of the stator, to achieve elasticity and natural frequencies of the stator torsional vibrations which effectively reduce forces on the foundation in the event of short circuit.

In general terms it is the case that when the stator frame 2 is fixed by means of adjusting devices such as spindles 12 or radial studs 27, the lamination assembly 1 can be restressed, even after periods of operation, and in particular its shape can easily be corrected in case of ovality or eccentricity.

With all the examples described so far it has been assumed that the stator laminations 1 and stator frame 2, or the whole stator, are prestressed when the machine is not running. In another version it is sufficient to prestress the stator only partially while the machine is stationary and then, as the stator temperature rises during operation, to actuate the means of adjustment provided, e.g. to tighten the actual spindles 29 or raise the fluid pressure acting on the hydraulic rams 34 in such a way that the stator laminations are never subjected to compressive forces when the machine is in service. When the maximum operating temperature is reached the amount of prestress on the stator laminations is checked and the stator is fixed in the manner described above.

Figure 14:
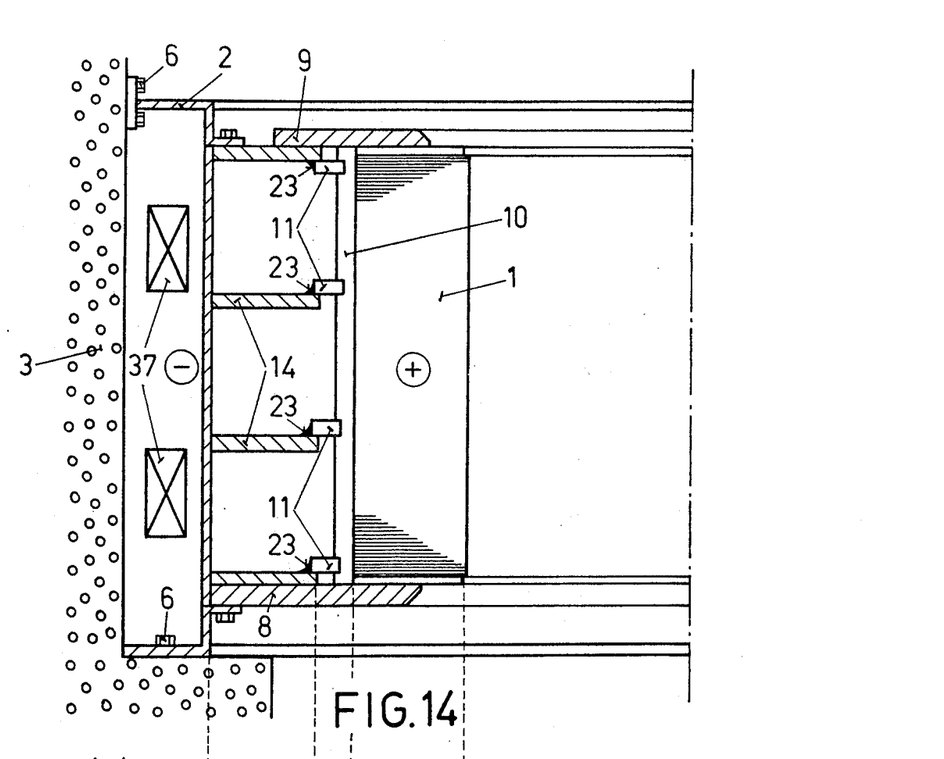
FIG. 14 is a vertical section through a part of the stator.

FIG. 14 again shows a part of the stator in vertical section. The various items are denoted by the same numbers as in the preceding figures. With this version of the invention the stator, located in the foundation 3 and fitted with its laminations, can be heated from the outside inwards by means of heaters 37 situated between foundation 3 and the stator frame 2.

Figure 15:
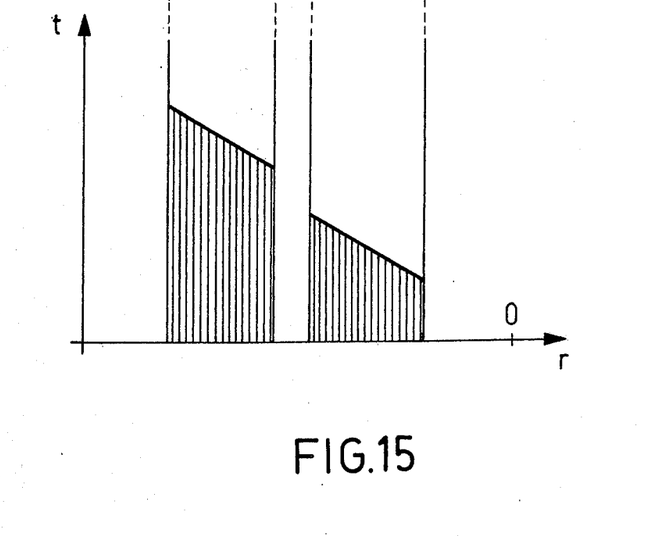
FIG. 15 is the corresponding temperature diagram.

As can be seen from FIG. 15, with a machine of this kind a temperature drop occurs which, in contrast to a machine in operation, exhibits temperatures $t$ which decrease in the direction from larger radii $r$ to smaller radii $r$. There is thus a temperature drop which diminishes from the exterior of the machine towards its interior 0. The thermal expansion of the stator frame 2 is thus greater than that of the stator laminations 1 so that the stator laminations 1 are subjected to tensile forces and the stator frame 2 to compressive forces. When the temperature of the stator has risen sufficiently the stator frame 2 is centred and fixed, as has been described above.

In another form of the invention the fully assembled machine can be run at very low power, e.g. a few percent of the rated power, and with the air coolers disconnected, until it reaches an appropriate temperature and hence degree of expansion. Since there is then practically no temperature drop from the machine interior outwards, when the stator is fixed, the stator laminations 1 cannot be subject to compressive forces, even at the maximum operating temperature. In many cases indeed, the air friction of the machine is sufficient to raise the machine temperature to the level required. This manner of heat treating the machine can of course be combined with the version of FIG. 14, heaters 37 being in the form of air coolers fed with hot water, for example. Since with this combination the stator experiences no significant torque, the stator frame 2 requires no radial guides during the heating process.

Figure 16:
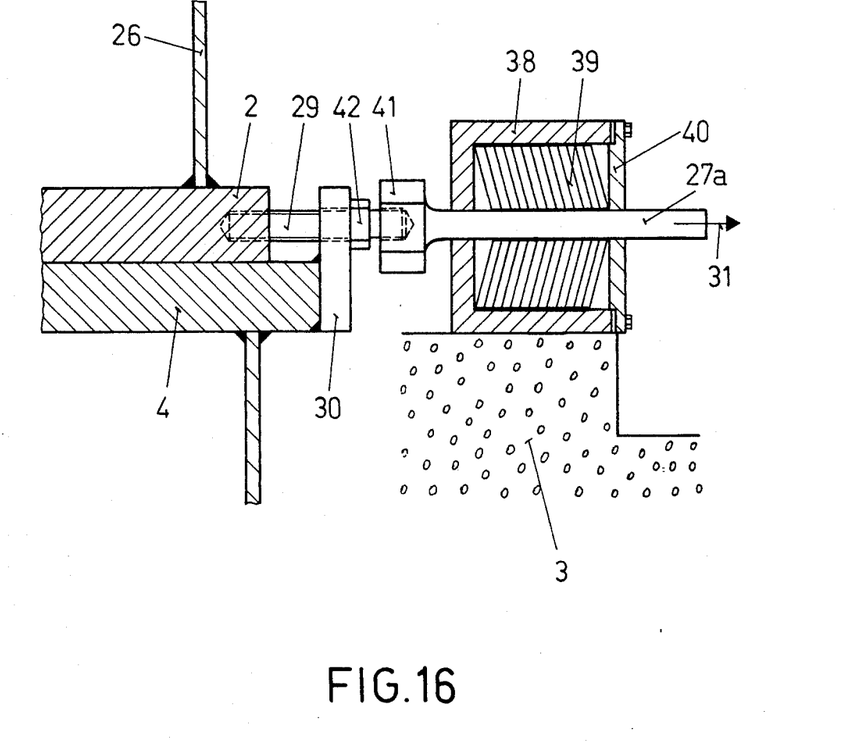
FIG. 16 is a fixing device.

FIG. 16 shows a device for fixing stator frame 2 which is particularly applicable to the examples last described above. This device is in the form of an automatic linear non-return lock. This comprises a tube 38 containing a series of conical washers 39, the stacked washers being located by fixing bolt 27a and pointing radially outwards. The washers 39 are also pressed together in the direction of the axis of fixing bolt 27a by a plate 40 so that a strong frictional bond exists at the periphery of fixing bolt 27a between this and the washers 39. The inward end of fixing bolt 27a is joined to the actual spindle 29, and hence to stator frame 2, by means of a nut 41. When the stator frame 2 undergoes expansion in the direction of arrow 31 due to heating, this is transmitted to fixing bolt 27a which, owing to the conical form and the arrangement of the washers 39, can also only move in the direction of arrow 31. If the linear non-return lock is to be used only as an erection aid, the actual spindle 29, acting as a fixing device, can be fixed by means of another nut 42 bearing on positioning flange 30, and the erection aid can be removed to be used again.

When linear non-return locks are used to fix the heated stator, hydraulic rams 34 can also be employed to assist in reaching the desired prestressing of the stator. With machines of this size the hydraulic rams can be held at the required pressure by the pumps used for high-pressure lubrication. As soon as this pressure and the machine temperature have reached their appropriate values the machine is fixed in one of the ways described.

It is also possible when fixing the lamination plates 11, e.g. by welding, to heat the assembly by induction heating before making the welds.

Figure 17:
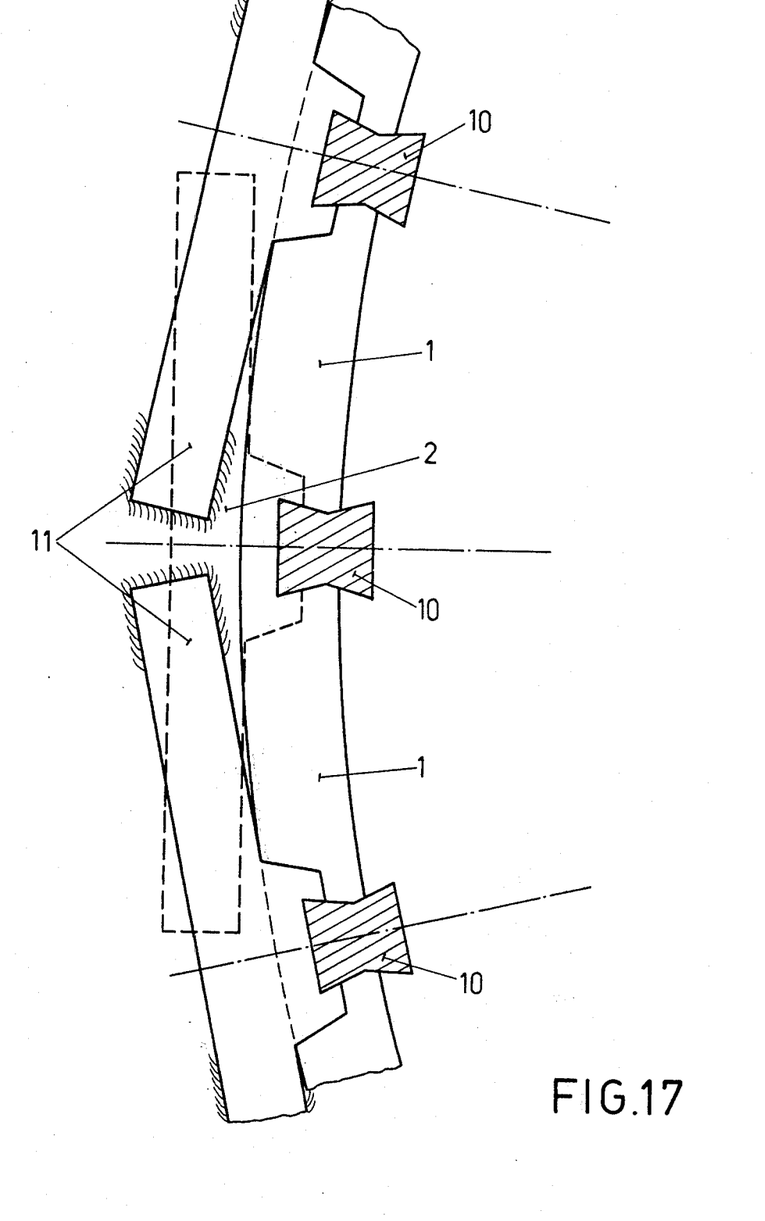
FIG. 17 shows an alternative method of joining the stator laminations and stator frame.

FIG. 17 shows a mode of connection which can be used for a relatively rigid stator frame 2 and stator lamination assembly 1. It is apparent that by means of the lamination plates 11 the lamination assembly 1 can be joined especially flexibly to the stator frame 2. The lamination plates 11 are positioned at a tangent to the edge of the lamination assembly cross-section and are fixed only at their ends, e.g. to the frame webs 14 of the stator frame 2. In this way the middle portions of the lamination plates 11 remain flexible in the direction of the stator radius. The stator lamination assembly 1 and stator frame 2 can again be prestressed by one of the methods described above.

Figure 18:
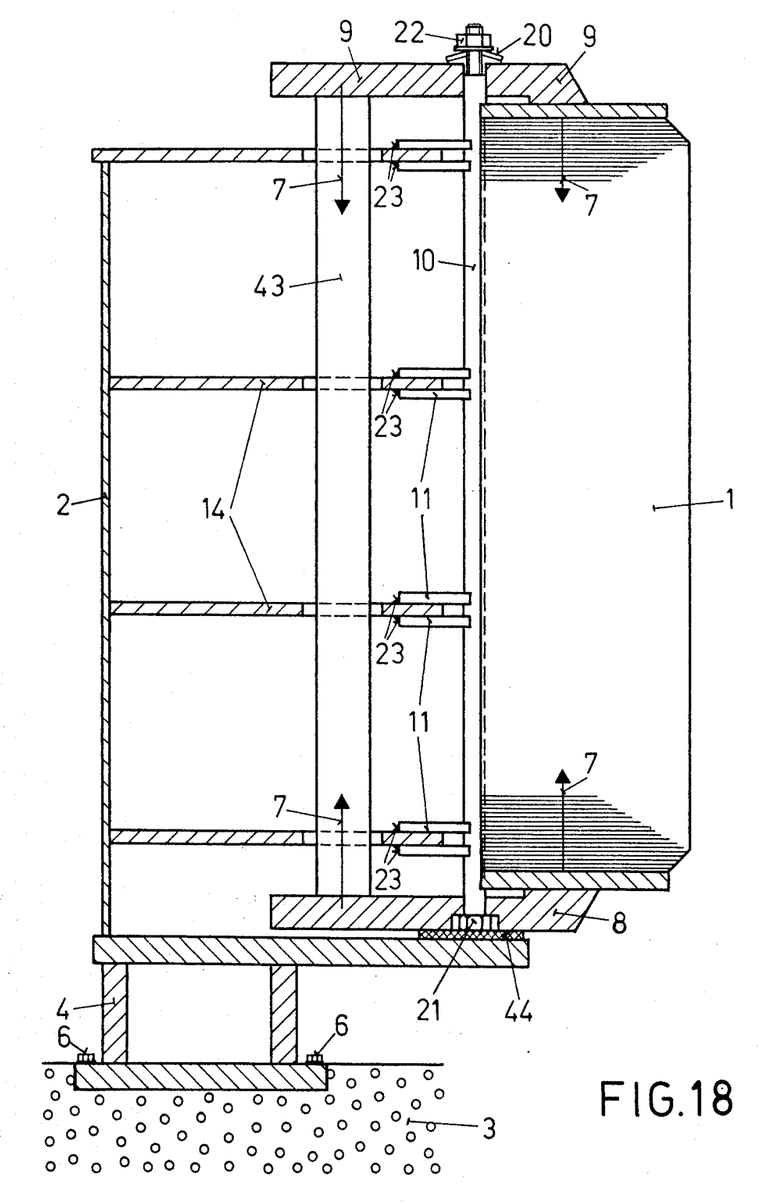
FIG. 18 is a further version of the invention.

FIG. 18 shows half a vertical section passing through the centre of a stator. Here the stator lamination assembly 1 can be moved not only radially, but also axially with respect to the stator. In order to allow relative axial movement also at the pressure plates 8 and 9, the compressive force in the direction of arrows 7 is transmitted not through the stator frame 2 but through columns 43, which are independent of the stator. The connection between stator laminations 1 and stator frame 2 is formed only be lamination plates 11. The resistance caused by stator laminations 1 against movement in the radial direction is dependent not only on the weight of lamination assembly 1, but also on its friction against foundation ring 4. This friction can be reduced, for example, by means of solid lubrication such as a layer of polytetrafluoroethylene or grease-impregnated nylon plates or molybdenum disulphide products, or by means of resilient packing 44, which can be of rubber, plastic, etc., located between parts 8 and 4. Since the stator frame 2 no longer takes part in transmitting the compressive force in the direction of arrows 7, its construction can be made simpler and its dimensions smaller. The mode of fixing the stator lamination assembly 1 shown in FIG. 18 can be employed in all cases where the assembly can be prestressed in the course of movement relative to the stator frame 2. With this version of the invention the stator lamination assembly 1 can be fully compressed before prestressing is applied.

Figure 19A:
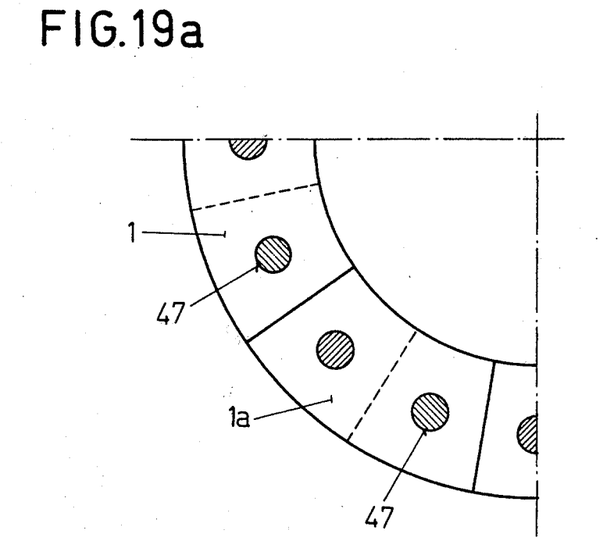
FIGS. 19a and 19b show methods of joining lamination segments.
Figure 19B:
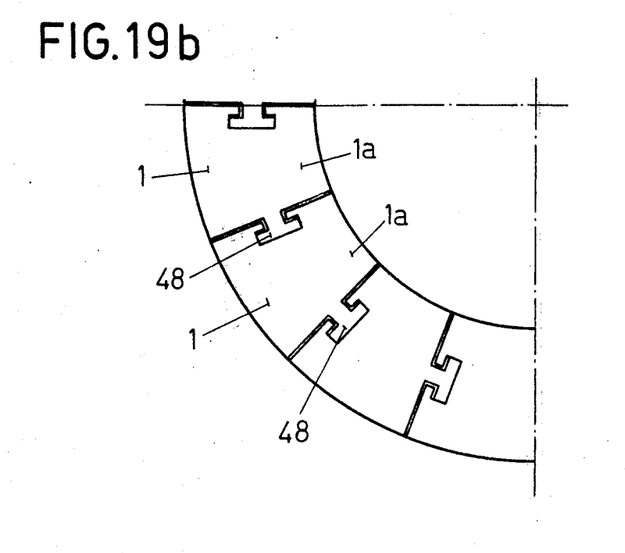

Further modes of maintaining the initial stress on the stator laminations 1 are shown in FIGS. 19a and 19b. These are positive mechanical modes of joining the lamination segments i a, which in FIG. 19a have bolts 47 passing axially through them, or in FIG. 19b are provided with hammer-head or dovetail joints 48.

I claim:

1. In a dynamo-electric machine of the type including a stator structure comprising a vertically disposed axially compressed assembly of annular laminations extending in radial planes relative to the vertical axis of the machine and a stator frame surrounding said annular lamination assembly, the improvement which resides in means interconnecting said stator frame with said annular lamination assembly such that said annular lamination assembly is pre-stressed in tension by said stator frame in a radially outward direction with respect to a cold condition of the machine, the magnitude of said pre-stress corresponding substantially to the difference in expansion between said stator laminations secured to the stator frame and laminations freely expandable at the operating temperature of the machine.

2. A stator structure for a dynamo-electric machine as defined in claim 1 wherein said means for prestressing said annular lamination assembly in tension in a radially outward direction comprises axially and circumferentially distributed jacking means located between said stator frame and a surrounding foundation for temporarily prestressing said stator frame in a radially inward direction, and said annular lamination assembly is fixed to said stator frame while the latter is prestressed thereby effecting prestressing of said annular lamination assembly in tension when said jacking means are removed.

3. A stator structure for a dynamo-electric machine as defined in claim 1 wherein said means for prestressing said annular lamination assembly in tension in a radially outward direction comprises sets of circumferentially spaced screw means mounted respectively at opposite ends of said stator frame and which apply radially directed forces against said stator frame.

4. A stator structure for a dynamo-electric machine as defined in claim 1 wherein said means for prestressing said annular lamination assembly in tension in a radially outward direction comprises circumferentially spaced wedge means interengaging foundation rings at the opposite ends of said stator frame and which apply radially outward forces thereto.

5. A stator structure for a dynamo-electric machine as defined in claim 1 wherein said means for prestressing said annular lamination assembly in tension in a radially outward direction comprises circumferentially spaced hydraulic rams interengaging foundation rings at the opposite ends of said stator frame and which apply radially outward forces to said stator frame.

6. A stator structure for a dynamo-electric machine as defined in claim 1 wherein said means for prestressing said annular lamination assembly in tension in a radially outward direction comprises heater means surrounding the periphery of said stator frame and located between said frame and the surrounding foundation for temporarily heating said stator frame from the outsides inward to establish a temperature gradient wherein the temperature decreases in the radially inward direction thus effecting a thermal expansion of said stator frame greater than that of said annular lamination assembly whereby the annular lamination assembly is subjected to tensile stresses and the stator frame subjected to compressive stresses.

7. A stator structure for a dynamo-electric machine as defined in claim 1 which includes air coolers and wherein said means for prestressing said annular lamination assembly in tension in a radially outward direction comprises temporary operation of said machine at low power with said air coolers shut down thereby generating heat within said stator frame to effect an expansion thereof, in combination with circumferentially spaced non-return locking means including locking members projecting from the periphery of said stator frame and complementary locking members mounted on the foundation of the machine.

8. A stator structure as defined in claim 7 for a dynamo-electric machine wherein each of said non-return locking means includes a bolt extending radially outward from the periphery of the stator frame engageable with an assembly of conical washers contained within a tube and through which the bolt can pass in the radially outward direction but is locked against any movement in the reverse direction.

9. A stator structure as defined in claim 7 wherein the air coolers of said machine utilize liquid as a coolant and wherein the liquid is heated to thus augment the heating effect generated within the machine by its temporary operation thereof at low power.

* * * * *